UNITED STATES PATENT OFFICE.

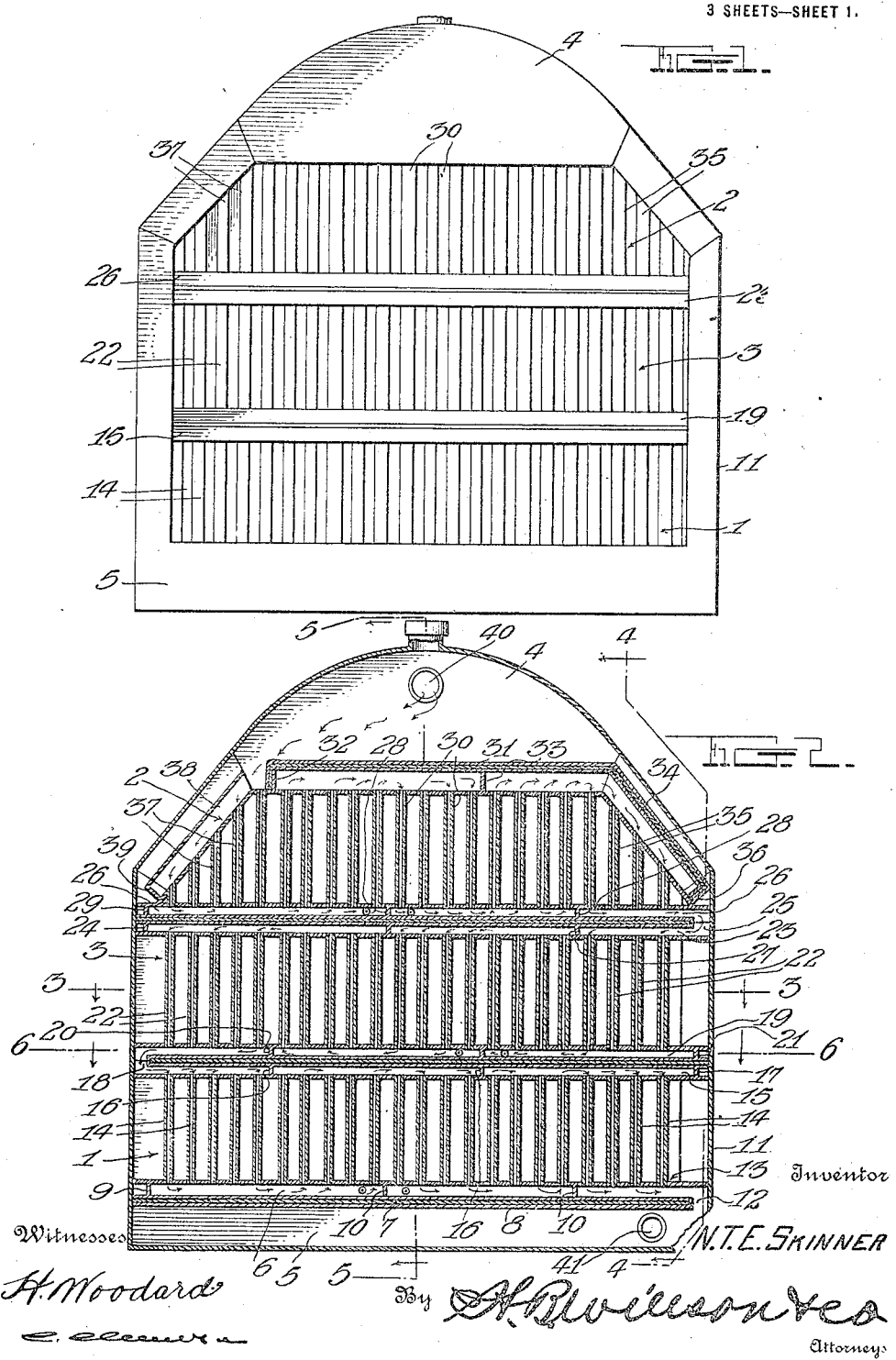

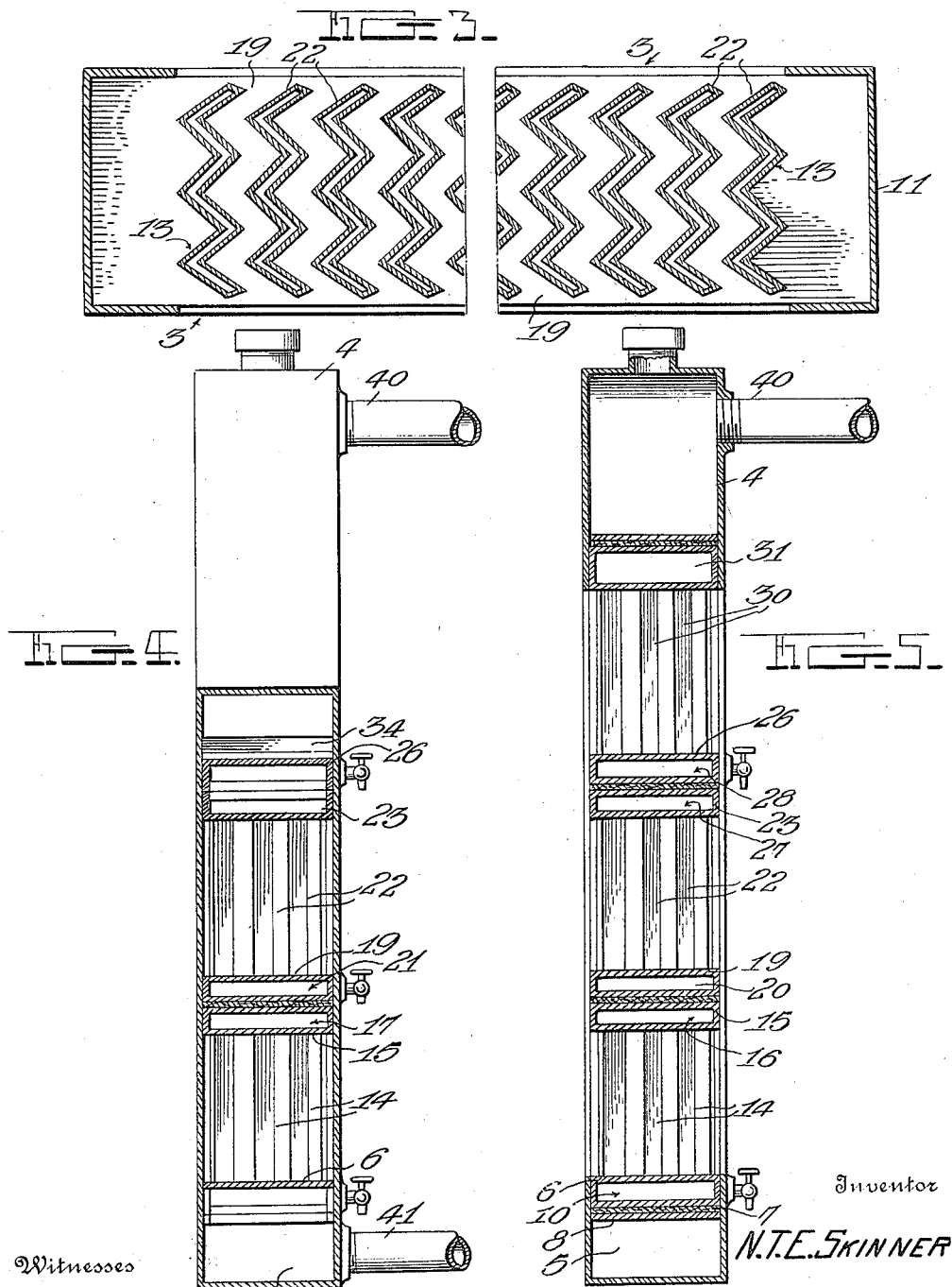

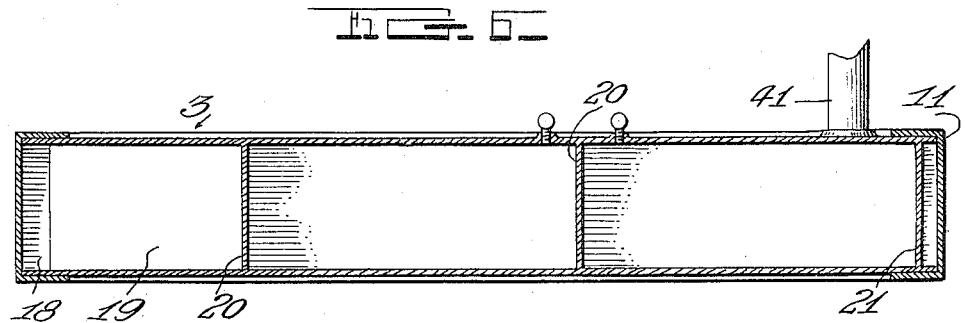
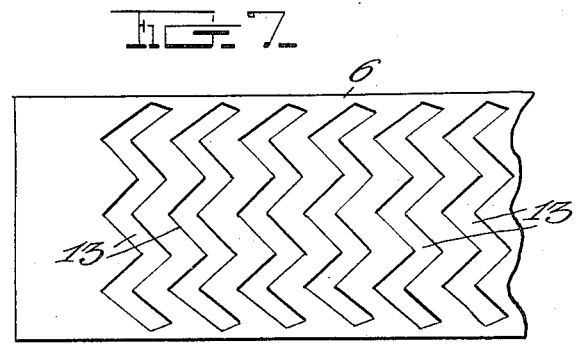
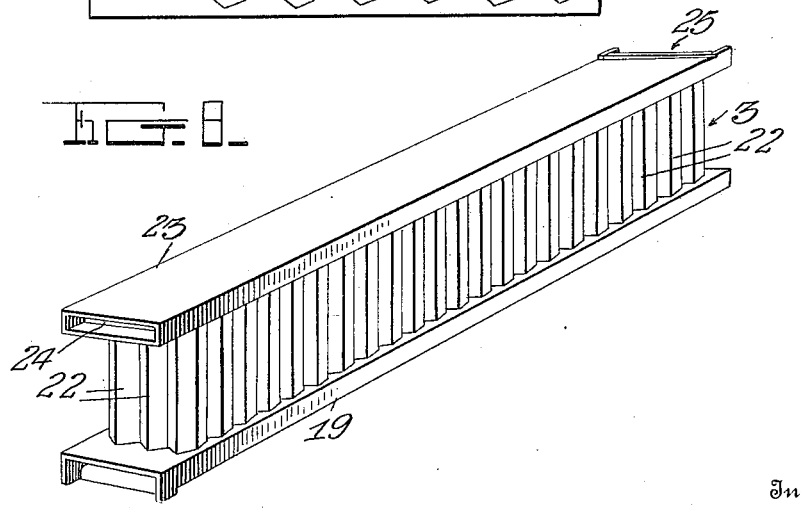

NOAH T. E. SKINNER, OF NEWARK, OHIO.

AUTOMOBILE-RADIATOR.

1,140,196.

Specification of Letters Patent.   Patented May 18, 1915.

Application filed May 14, 1914.   Serial No. 838,598.

*To all whom it may concern:*

Be it known that I, NOAH T. E. SKINNER, a citizen of the United States, residing at Newark, in the county of Licking and State of Ohio, have invented certain new and useful Improvements in Automobile-Radiators; and I do declare the following to be a full, clear, and exact description of the invention, such as will enable others skilled in the art to which it appertains to make and use the same.

My invention relates to improvements in automobile radiators and has for its primary object to provide a device of this character having a number of circulating passages and conduits so located and constructed as to provide an increased radiating surface whereby the water, flowing therethrough, will be quickly and effectually cooled.

A secondary object of the invention is to construct the entire device in the most simple manner consistent with its proper operation.

With the above objects in view, the invention resides in certain novel features of construction and combination herein described and claimed and shown in the drawings wherein:

Figure 1 is a front elevation of a radiator constructed in accordance with my invention: Fig. 2 is a vertical transverse section thereof: Fig. 3 is a horizontal section taken along the plane of the line 3—3 of Fig. 2: Fig. 4 is a detail vertical section taken on the line 4—4 of Fig. 2: Fig. 5 is a central vertical section taken on the line 5—5 of Fig. 2: Fig. 6 is a view similar to Fig. 3 taken on line 6—6 of Fig. 2: Fig. 7 is a plan view of a portion of one of the horizontal conduits, and, Fig. 8 is a perspective view of one section of the radiator.

In the accompanying drawings I have illustrated my invention as comprising three sections, a lower section 1, an upper section 2, and an intermediate section 3 disposed between said upper and lower sections, water receptacles 4 and 5 being disposed above and below the three sections. The section 1 comprises a lower conduit 6 which is preferably of rectangular formation in cross section and which extends throughout the width of the radiator, the lower side of said conduit resting upon a sheet of asbestos 7 which is supported by the upper wall 8 of the lower water receptacle 5, said conduit being entirely closed at one end by an upright end wall 9 while, disposed at suitable right end wall 9 while, disposed at suitable intervals, transverse partitions 10 control the flow of water in a manner to appear.

As most clearly shown in Fig. 2, the end of the conduit 6, opposite the wall 9, is normally closed by an upright wall 11 which constitutes part of a casing which incloses the entire device. It will also be seen by reference to this Fig. 2 that the end of the conduit, adjacent said wall 11, is provided with a discharge opening 12 through which water from said conduit is adapted to flow into the receptacle 5 as indicated by the arrow. The upper side of the conduit 6 is provided with a number of zigzag openings 13 in which a plurality of upright circulating members 14 which are of zigzag formation in cross section, are secured, said members having their upper ends rigidly secured in similar openings which are formed in the lower side of an upper conduit 15, said conduit being of similar construction to the conduit 6 and having a number of transverse partitions 16 which are alternately arranged in respect to the partitions 10. As clearly shown in Fig. 2, the end of the conduit 15, above the opening 12, is closed by an end wall 17 while its opposite end is provided with an opening 18 in its upper side, said opening communicating with the interior of a lower conduit 19 which constitutes a portion of the central section 3.

The conduit 19 is identical in construction with the conduit 15 and is provided with a number of partitions 20 and with an end wall 21, said partitions and the end wall being disposed above the partitions 16 and wall 17. In employing the conduit 19, it will be understood that although the construction is identical with that of the conduit 15, said conduit 19 is reversed in order that its zigzag openings may be disposed in its upper end, said openings receiving the lower ends of upright circulating members 22 which are constructed in the same manner as the members 14 previously described and have their upper ends communicating with an upper conduit 23 which completes the central section 3. As clearly shown in the drawings, the end of the conduit 23 above the discharge openings 18, is closed by an upright end wall 24 while the opposite end thereof communicates through an opening 25 with the lowermost conduit 26 of the upper section 2. It will be further seen that said conduit 23 is provided with a number of partitions 27 which are arranged directly above the partitions 10 and alternately arranged in respect to the partitions 20.

The conduit 26 is identical in construction with the conduit 23 with the exception that it is reversed to position its zigzag openings in its upper side, said conduit having a number of partitions 28 which are disposed above the partitions 27 and have one end closed by a solid wall 29 which is located directly above the end wall 24 of the conduit 23.

Rising from the intermediate portion of the conduit 26, is a plurality of upright circulating members 30 which are similar in construction to the members previously described and which communicate, at their upper ends, with an uppermost conduit 31, the latter being of less length than the conduits previously described and having one of its ends closed by an upright wall 32 which is disposed directly above one of the endmost partitions 20 while its intermediate portion is provided with a partition 33 which is alternately located in respect to the partitions 28. The open end of the conduit 31 communicates with a downwardly and outwardly inclined passage 34 between which and the discharge end of the conduit 26, a number of upright circulating members 35 establish communication, said passage 34 being closed at its lower end as indicated at 36 for obvious reasons.

Rising from the opposite end of the conduit 26 is a number of upright circulating members 37 which communicate with the lower side of a downwardly and outwardly inclined passage 38, said passage being closed at its lower end as indicated at 39 and having its upper end in communication with the uppermost water receptacle 4 which is provided with an inlet opening 40 through which the heated water, from the engine jacket, is conducted into said receptacle 4.

From the receptacle 4, the heated water will flow through the passage 38, through the circulating member 37 and into one end of the conduit 26 and, since the adjacent partition 27 limits lateral movement of the water, the same is forced to travel upwardly through certain of the tubes 30 and into the conduit 31 in which, the partition 33 checks the lateral direction of the flow and causes the water to again descend into the conduit 26 from which it will again rise to the conduit 31, finally discharging through the members 35 and the discharge opening 25 into the central section 3 in which the direction of movement above described is repeated until said water is discharged into the conduit 15 of the lower section. From this conduit 15 the water circulates downwardly and upwardly and is finally discharged through the opening 12 into the lowermost water receptacle 5 from which it returns to the engine jacket through the discharge opening 41.

From the above described construction and operation, it will be seen that the water is forced to remain an appreciable length of time within the radiator and that a great number of cooling surfaces are provided, thus effectually cooling the water by the time it returns to the engine jacket.

I have described my invention with considerable minuteness but I do not wish to be limited to details of construction other than those amplified in the appended claims. It may be here explained that a lining of asbestos, similar to the lining 7 is located between the conduits 15 and 19, between those designated at 23 and 26 and on the upper sides of the conduits 31 and 34. If desired, a number of drain cocks (shown in Figs. 4, 5, and 6) may be employed for draining the radiator.

Having thus described my invention, what I claim is:

1. A radiator including upper and lower water receptacles, a lateral conduit forming the lower end of the upper receptacle and having one of its ends inclined downwardly and outwardly, both ends of the conduit being closed, a passage spaced from and inclining downwardly and outwardly from the rectilinear end of the conduit and closed at its lower end, its upper end communicating with the upper water receptacle, a lower conduit beneath the two inclined passages, a number of upright circulating members establishing communication between the upper and lower conduits and between the inclined passages and the lower conduit, alternately arranged partitions in the upper and lower conduits and a pasageway from the lower conduit to the lower receptacle.

2. A radiator including a lower section comprising upper and lower conduits, upright circulating members establishing communication between the two, the upper conduit having an inlet opening and the lower conduit having an outlet opening, a number of partitions in each conduit and disposed in staggered relation, an upper section including a lower conduit resting on the upper conduit of the lower section and in communication therewith through its opening, a number of partitions in said lower conduit of the upper section and disposed above those in the upper conduit of the lower section, a number of circulating members rising from said lower conduit of the upper section, an uppermost conduit communicating with said last mentioned members, a number of partitions in said uppermost conduit and disposed above those in the lowermost conduit and a water inlet into said uppermost conduit.

In testimony whereof I have hereunto set my hand in presence of two subscribing witnesses.

NOAH T. E. SKINNER.

Witnesses:
LAURA E. CASE,
JAMES R. FITZGIBBON.